United States Patent
Joshi et al.

(10) Patent No.: US 11,856,038 B2
(45) Date of Patent: Dec. 26, 2023

(54) COGNITIVELY LEARNING TO GENERATE SCRIPTS THAT SIMULATE LIVE-AGENT ACTIONS AND RESPONSES IN SYNCHRONOUS CONFERENCING

(71) Applicant: International Business Machines Corporation, Armonk, NY (US)

(72) Inventors: Sachindra Joshi, Gurgaon (IN); Jatin Ganhotra, White Plains, NY (US); Chulaka Gunasekara, New Hyde Park, NY (US); Luis A. Lastras-Montano, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/331,840

(22) Filed: May 27, 2021

(65) Prior Publication Data
US 2022/0385703 A1    Dec. 1, 2022

(51) Int. Cl.
*H04L 65/403* (2022.01)
*G06N 20/00* (2019.01)
(Continued)

(52) U.S. Cl.
CPC .............. *H04L 65/403* (2013.01); *G06F 8/30* (2013.01); *G06F 40/30* (2020.01); *G06N 20/00* (2019.01); *H04L 51/02* (2013.01)

(58) Field of Classification Search
CPC ... H04L 65/403; H04L 51/02; H04L 12/1822; H04L 65/4015; G06F 8/30; G06F 40/30;
(Continued)

(56) References Cited

U.S. PATENT DOCUMENTS 9,990,591 B2    6/2018  Gelfenbeyn et al.
10,274,911 B2   4/2019  Uppala et al.
(Continued)

FOREIGN PATENT DOCUMENTS

JP    6686226 B2    4/2020

OTHER PUBLICATIONS

Ahmadvand et al. "Emory irisbot: An open-domain conversational bot for personalized information access." Alexa Prize Proceedings (2018). 20 pages.
(Continued)

*Primary Examiner* — Soe Hlaing
(74) *Attorney, Agent, or Firm* — Stosch Sabo; Cantor Colburn LLP

(57) ABSTRACT

Embodiments of the invention are directed to a computer-implemented method of responding to an inquiry received electronically at a synchronous conferencing system (SCS). A non-limiting example of the computer-implemented method includes, based at least in part on the inquiry, using a processor of the SCS to generate a script having one or more script computer instructions. The processor is used to execute the script computer instructions to generate script computer instruction results, wherein the script computer instruction results include inquiry response information that is responsive to the inquiry. Based at least in part on the inquiry and the inquiry response information, the processor is used to generate an inquiry response that is responsive to the inquiry.

20 Claims, 12 Drawing Sheets

(51) Int. Cl.
*G06F 40/20* (2020.01)
*G06F 8/30* (2018.01)
*H04L 51/02* (2022.01)
*G06F 40/30* (2020.01)

(58) Field of Classification Search
CPC ... G06F 8/38; G06F 8/36; G06F 40/35; G06F 16/3329; G06N 20/00; G06N 3/084; G06N 3/0455; G06N 3/08; G06N 3/088
See application file for complete search history.

(56) References Cited

U.S. PATENT DOCUMENTS

| | | | |
|---|---|---|---|
| 10,783,877 | B2 | 9/2020 | Solanki et al. |
| 2009/0043749 | A1 | 2/2009 | Garg et al. |
| 2014/0317030 | A1 | 10/2014 | Shen et al. |
| 2014/0365222 | A1 | 12/2014 | Weider et al. |
| 2015/0066479 | A1 | 3/2015 | Pasupalak et al. |
| 2018/0165691 | A1* | 6/2018 | Heater .................. G06F 40/205 |
| 2019/0340485 | A1* | 11/2019 | Ngo ........................ G06N 3/084 |
| 2019/0370342 | A1* | 12/2019 | Luke ...................... G06N 5/046 |
| 2020/0005117 | A1 | 1/2020 | Yuan et al. |
| 2021/0042392 | A1* | 2/2021 | Korhonen .............. G06F 40/30 |
| 2021/0044547 | A1* | 2/2021 | Bradley .................. H04L 51/02 |
| 2022/0171641 | A1* | 6/2022 | Pichiliani ................ H04L 51/56 |

OTHER PUBLICATIONS

Batura, Anna. "Integrating Virtual Assistant Technology into omni-channel processes." 2019. South-Eastern Finland, University of Applied Sciences, Bachelor's thesis. 59 pages.

Israr et al., "Proposal for a Chatbot To Conduct Human-Like Conversation With Students of Eastern Illinois University." Technology Interface International Journal, vol. 19, (2018): 20-23.

Lewis et al. "BART: Denoising sequence-to-sequence pre-training for natural language generation, translation, and comprehension." arXiv preprint arXiv:1910.13461. 2019. 10 pages.

Nuruzzaman et al. "A survey on chatbot implementation in customer service industry through deep neural networks." 2018 IEEE 15th International Conference on e-Business Engineering (ICEBE). IEEE. 2018. pp. 54-61.

Przegalinska et al. "In bot we trust: A new methodology of chatbot performance measures." Business Horizons 62.6 (2019): 785-797.

* cited by examiner

COGNITIVELY LEARNING TO GENERATE SCRIPTS THAT SIMULATE LIVE-AGENT ACTIONS AND RESPONSES IN SYNCHRONOUS CONFERENCING

BACKGROUND

The present invention relates in general to programmable computers in networked communications systems. More specifically, the present invention relates to computing systems, computer-implemented methods, and computer program products that reduce live-agent workloads in synchronous conferencing systems (e.g., "online chat" systems) by providing a conversational agent configured and arranged to, inter alia, cognitively learn to generate scripts (e.g., a set of computer instructions) that, when executed, automatically simulate selected live-agent actions.

The terms "synchronous conferencing system" (SCS) describe a class of computer-based communication technologies that are widely used in interactive computing networks (e.g., the internet) to enable two or more users to communicate with one another in real time. Specifically, a user sends a message (e.g., natural language textual data) to another user through a synchronous conferencing application or computer program of the SCS. The latter user ideally responds to the message within a short period of time (e.g., seconds or minutes). Thus, SCS technologies facilitate a conversation in which electronic messages are passed back and forth between at least two users.

Messages exchanged through an SCS generally contain textual data. However, some SCS technologies allow the exchange of other types of multimedia content (e.g., audio/video). The messages are typically short in length, though longer messages can be appropriate in certain contexts (e.g., a question/answer exchange). Frequently, multiple messages that are part of the same conversation are exchanged within a so-called SCS session that beneficially groups the related messages together and provides context. The messages are frequently displayed to each user within a window in a graphical user interface (GUI) at the user's local computer display.

SCS technologies can be implemented as a customer-service tool in online ecommerce settings where it is desirable to allow online customers visiting a merchant's website to immediately initiate an online conversation/chat with a merchant. In a conventional customer-service SCS session, the customer is one user, and a representative of the merchant can be another user. In some implementations of a customer-service SCS, the merchant representative can be a person, which is also known as a "live-agent." In some implementations of a customer-service SCS, the merchant representative can be a computer-implemented agent, which is also known as a "conversational agent" (CA) or a "chatbot." In general, a CA can be defined as a computer system configured to communicate with a human using a coherent structure. CA systems can employ a variety of communication mechanisms, including, for example, text, speech, graphics, haptics, gestures, and the like for communication on both the input and output channels. CA systems also employ various forms of natural language processing (NLP), which is a field of computer science, artificial intelligence, and computational linguistics concerned with the interactions between computers and humans using language.

CA-run SCS sessions can be very responsive and much faster than live-agent run SCS sessions. However, among the challenges in implementing CA-run SCS sessions is enabling SCS computers to derive meaning from natural language (NL) inputs, as well as the effective and efficient generation of NL outputs. Known CA-run SCS sessions are "rule-based," which means that a CA-run SCS session selects a response based on a variety of rules that have been determined and explicitly coded into the CA. Rules-based systems are best suited to situations in which there is a lower volume of data, the incoming data is relatively stable, and the corresponding rules are relatively simple. As an example, companies use rules-based systems for expense approvals, and the relevant rules can include various defined dollar thresholds that require management approvals at various levels.

Live-agent run SCS sessions have the benefit of the live-agent being able to think outside the box; are not limited to processing pre-programmed information; and can understand and provide answers to any customer question that pertains to the merchant's business. However, because human resources are so heavily involved in live-agent run SCS sessions, there are limitations on the ability of live-agents to process multiple concurrent sessions at the same time. Additionally, the value to the merchant and/or the customer of having a live-agent respond to a customer inquiry diminishes as the type of customer inquiry becomes increasingly simple, common, monogamous, and/or repetitive.

SUMMARY

Embodiments of the invention are directed to a computer-implemented method of responding to an inquiry received electronically at a synchronous conferencing system (SCS). A non-limiting example of the computer-implemented method includes, based at least in part on the inquiry, using a processor of the SCS to generate a script having one or more script computer instructions. The processor executes the script computer instructions to generate script computer instruction results, wherein the script computer instruction results include inquiry response information that is responsive to the inquiry. Based at least in part on the inquiry and the inquiry response information, the processor generates an inquiry response that is responsive to the inquiry.

In some aspects of the invention, the above-described embodiments of the invention can further include the one or more script computer instructions being configured to, when executed by the processor, simulate live-agent processor control actions. The live-agent processor control actions include processor control actions that can be taken by a live-agent during an attempt by the live-agent to utilize the processor to generate the inquiry response information.

In some aspects of the invention, the above-described embodiments of the invention can further include the operation of using the processor to generate the inquiry response being further based at least in part on the one or more script computer instructions.

Technical effects and benefits of the previously-described embodiments of the invention include using the processor of the SCS to generate the scripts, where the scripts simulate selected live-agent operations. In accordance with aspects of the invention, the selected live-agent operations include simple, repetitive live-agent operations that can be automated in a manner that frees up the time of live-agents so they can focus on more complex tasks and not have to devote live-agent time to addressing simple, repetitive requests submitted by users.

In some aspects of the invention, the above-described embodiments of the invention can further include the processor being configured to include a first model trained to perform a first task that includes generating the script based at least in part on the inquiry.

In some aspects of the invention, the above-described embodiments of the invention can further include the processor being further configured to include a second model trained to perform a second task that includes generating the inquiry response based at least in part on the inquiry and the inquiry response information.

In some aspects of the invention, the above-described embodiments of the invention can further include configuring the second task to further include generating the inquiry response based at least in part on the inquiry, the one or more script computer instructions, and the inquiry response information.

Additional technical effects and benefits of the previously-described embodiments of the invention include using the processor of the SCS to execute models that have been trained to generate the scripts, where the scripts simulate selected live-agent operations. In aspects of the invention, a first model is trained to generate the scripts, and a second model is trained to generate the inquiry response based on at least two of the inquiry, the scripts, and the inquiry response information. Technical effects and benefits of embodiments of the invention include configuring embodiment of the invention to beneficially utilize labeled data for training the first and second models. However, because embodiments of the invention focus on training the models to perform conditional but not overly-complicated live-agent tasks, the amount of labeled data does not need to be high (e.g., about 1000 conversations per overall task(s) performed by each model). As used herein, the term "conditional" means that the live-agent operations being modeled are based upon (or "grounded" in) information provided to the live-agent (e.g., by the other chat participant) through the SCS session. Some embodiments of the invention can leverage pre-trained models (examples of which are described subsequently herein) that can be further trained in a fine-tuned manner on labeled data so they learn to perform well on the above-described first and second model tasks. In accordance with aspects of the invention, this can be achieved by using a much smaller labeled data size (e.g., about 10 conversations per overall task(s) performed by each model). In accordance with aspects of the invention, the selected live-agent operations that are implemented by the first and second models include simple, repetitive live-agent operations that can be automated in a manner that frees up the time of live-agents so they can focus on more complex tasks and not have to devote live-agent time to addressing simple, repetitive requests submitted by users.

Embodiments of the invention are also directed to computer systems and computer program products having substantially the same features, technical effects, and technical benefits as the computer-implemented methods described above.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

Figure 1:
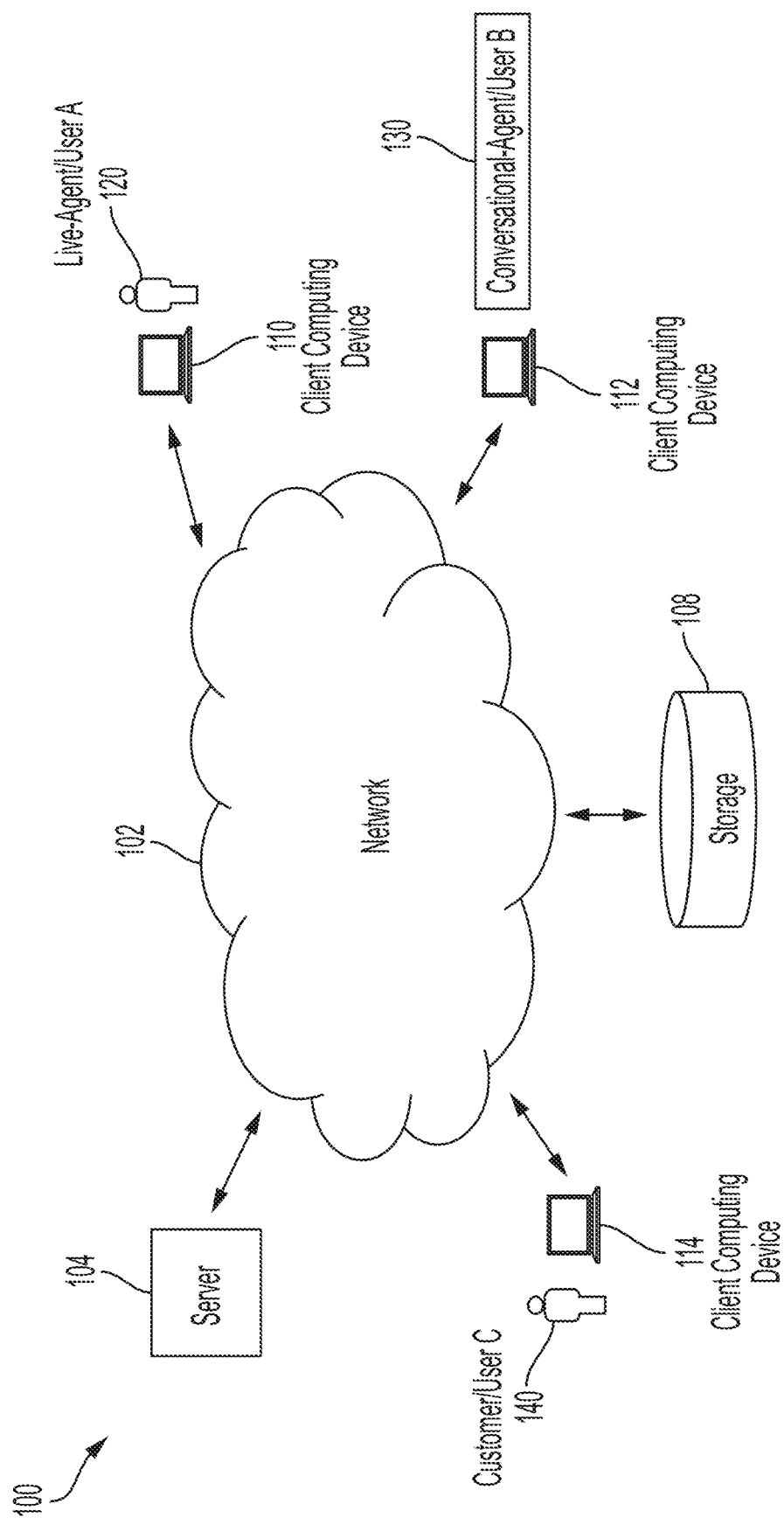
FIG. 1 depicts a block diagram illustrating a synchronous conferencing system (SCS) capable of implementing embodiments of the invention.

In the accompanying figures and following detailed description of the disclosed embodiments, the various elements illustrated in the figures are provided with three digit reference numbers. In some instances, the leftmost digits of each reference number corresponds to the figure in which its element is first illustrated.

DETAILED DESCRIPTION

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Many of the functional units of the systems described in this specification have been labeled as modules. Embodiments of the invention apply to a wide variety of module implementations. For example, a module can be implemented as a hardware circuit including custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together but can include disparate instructions stored in different locations which, when joined logically together, function as the module and achieve the stated purpose for the module.

Many of the functional units of the systems described in this specification have been labeled as models. Embodiments of the invention apply to a wide variety of model implementations. For example, the models described herein can be implemented as machine learning algorithms and natural language processing algorithms configured and arranged to uncover unknown relationships between data/information and generate a model that applies the uncovered relationship to new data/information in order to perform an assigned task of the model. In aspects of the invention, the models described herein can have all of the features and functionality of the models depicted in FIGS. 2, 6A, and 7, which are described in greater detail subsequently herein.

The various components/modules/models of the systems illustrated herein are depicted separately for ease of illustration and explanation. In embodiments of the invention, the functions performed by the various components/modules/models can be distributed differently than shown without departing from the scope of the various embodiments of the invention describe herein unless it is specifically stated otherwise.

Turning now to an overview of aspects of the invention, embodiments of the invention described herein provide computing systems, computer-implemented methods, and computer program products that reduce live-agent workloads in synchronous conferencing systems (SCSs) (e.g., "online chat" systems) by providing a novel conversational agent (CA) configured and arranged to cognitively learn to analyze SCS session messages for the purpose of determining that the novel CA can take over the SCS session and perform the live-agent activities for all or a portion of that SCS session. In some embodiments of the invention, the novel CA can be integrated within the SCS or provided as a separate unit (e.g., a client computing device) in communication with the SCS. The novel CA described herein is identified as a script-generating CA because, in some aspects of the invention, the script-generating CA has learned to generate scripts (e.g., a set of one or more computer instructions) that automatically simulate selected ones of the live-agent actions that would be performed by a live-agent participating in the SCS session with another user (e.g., a customer). The novel CA described herein is also identified as a conditional CA because, in some aspects of the invention, the conditional CA takes actions and/or generates responses that, in addition to simulating live-agent responses/activities, depend upon (or are "grounded" in) the conditional CA understanding, in accordance with aspects of the invention, the meaning of information (e.g., a query) contained in SCS messages inserted into the SCS session by the other session participant. In some aspects of the invention, the novel CA described herein can include either or both of the above-described script-generating features and the above-described conditional features, in which case the novel CA described herein can be described as a script-generating, conditional CA (SGC-CA).

In embodiments of the invention, the SGC-CA is configured to monitor and analyze SCS messages (or a single SCS message) in an SCS session under-analysis to determine that the SGC-CA can take over the responsibilities of a live-agent that is (or would be) participating in the SCS session. In some embodiments of the invention, the SGC-CA uses a first machine learning model having natural language functionality and trained to evaluate the message(s) in the SCS session and perform the task of determining that the SGC-CA has the capability to perform (or take over) the actions that would be taken by a live-agent participating in the SCS session. In embodiments of the invention, the first machine learning model can be incorporated within the SCS or the SGC-CA. In some embodiments of the invention, the first machine learning model can be a first language model (or a generative language model). If the first machine learning model determines that the SCS session can be run by the SGC-CA, the first machine learning model enables the SGC-CA to perform (or take over) the actions that would be taken by a live-agent participating in the SCS session.

In embodiments of the invention, when the SGC-CA is enabled and running the SCS session, the SGC-CA is configured and arranged to perform simulated agent operations, including, for example, understanding the meaning of information (e.g., a query, agent-requested information, etc.) contained in messages inserted into the SCS session by the other participant in the SCS session; generating and inserting messages into the SCS session that request information from the other participant in the SCS session; generating and executing scripts (e.g., a set of computer instructions) that, when executed, automatically simulate selected ones of the live-agent actions that would have been performed by a live-agent participating in the SCS session the other user (e.g., a customer); and generating and inserting messages into the SCS session that are responsive to request and/or inquiry messages generated by the other participant in the SCS session. In some embodiments of the invention, the SGC-CA uses additional machine learning models having natural language functionality and trained to perform tasks to support the above-described operations that would be performed by a live-agent if the live-agent were running the SCS session. In some embodiments of the invention, the SGC-CA can include an agent activity module (e.g., a robotic process automation (RPA) algorithm) configured and arranged to execute the computer instructions of the script. In some embodiments of the invention, the additional machine learning models can be implemented using additional language models, which can be implemented using a variety of encoder-decoder architectures, including but not limited to sequence-to-sequence architectures, RNN architectures, and various transformer model architectures (or generative language model architectures). In some aspects of the invention, the additional language models can be implemented using pre-trained transformer model architectures and fine-tuning the training of the pre-trained transformer model architectures to perform the above-described operations in accordance with embodiments of the invention. In embodiments of the invention, suitable examples of the previously-described various transformer model architectures (or generative language model architectures) include, but are not limited to, BERT (Bidirectional Encoder Representations from Transformers), GPT (Generative Pre-trained Transformer) (including GPT1, GPT2, and the like), and/or BART (bidirectional and auto-regressive transformer).

In aspects of the invention, the various language models that support the functionality of the SGC-CA can be trained to support various categories of SCS sessions. In some embodiments of the invention, the SCS session categories can each be based at least in part on an assessment that the category involves a level of live-agent cognitive determinations that are beyond what can be efficiently implemented in a rule-based CA; and the category involves a level of live-agent cognitive determinations that are not so complex that they would be more efficiently and/or effectively be performed by a live-agent. For example, category A of live-agent run SCS session categories can be defined as "internet service interruptions," which includes live-agent run SCS sessions in which a user has initiated the SCS session with a live-agent of an internet service provider (ISP) to determine why the user's internet services is malfunctioning. For training purposes, data of category A live-agent run SCS sessions are gathered and labeled. In embodiments of the invention, the labeled data of the category A live-agent run SCS session can include, but are not limited to, data that identifies messages exchanged between the user and the live-agent in the SCS session; data that identifies the live-agent activities (e.g., looking up the user's account information on a computer) performed by the live-agent during the SCS session; data that identifies outputs (e.g., computer-generated outputs) that are generated in response to the live-agent activities performed by the live-agent during the SCS session; and data that identifies "responses" generated by the live-agent based on the outputs generated in response to the live-agent activities performed by the live-agent during the SCS session. The labeled training data is used to train the various language models (e.g., as described in preceding paragraphs) that support the functionality of the SGC-CA in executing live-agent responsibilities for SCS sessions that fall into category A. In some embodiments of the invention, the training is applied to language models that have not been pre-trained. In some embodiments of the invention, the training is so-called "fine-tuned" training applied to pre-trained models, examples of which include the previously-described transformer model architectures such as BERT, GPT, GPT1, GPT2, BART, and the like.

Turning now to a more detailed description of various embodiments of the invention, FIG. 1 depicts a block diagram illustrating an SCS 100 capable of implementing embodiments of the invention. The SCS 100 includes a server 104, multiple client computing devices 110, 112, 114, and a storage 108, all of which are in communication with one another through a network 102. A live-agent (or User A) 120 has access to the client computing device 110 for purposes of operating the client computing device 110 in manner that allows the live-agent 120 to participate in a synchronous conference over the network 102 with other users of the network 102 (e.g., a customer 140). A CA (or User B) 130 is in communication with (or incorporated within) the client computing device 112 for purposes of operating the client computing device 112 in a manner that allows the CA 130 to implement a variety of the operations described herein in accordance with aspects of the invention, which includes participating in a synchronous conference over the network 102 with other users of the network 102 (e.g., the customer 140). The customer (or User C) 140 has access to the client computing device 114 for purposes of operating the client computing device 114 in a manner that allows the customer 140 to participate in a synchronous conference over the network 102 with other users of the network 102 (e.g., the live-agent 120 and/or the CA 130).

For ease of illustration, one example of each of server 104, the storage 108, and the client computing devices 110, 112, 114 is shown. However, it is understood that embodiments of the invention can accommodate any number of the server 140, the storage 108, and the client computing devices 110, 112, 114. Similarly, for ease of illustration, one example of each of the live-agent 120, the CA 130, and the customer 140 is shown. However, it is understood that embodiments of the invention can accommodate any number of the live-agent 120, the CA 130, and the customer 140. In embodiments of the invention, the server 104 and the client computing devices 110, 112, 114 can be configured to include all of the features and functionality of the computing system 800 (shown in FIG. 8).

The SCS 100 is configured and arranged to provide a mechanism for defining and managing virtual discussion threads in the SCS 100. In operation, the server 104 and one or more of the client computing devices 110, 112, 114 define a virtual discussion thread (VDT) entity that includes a group of chat entries or parts of chat entries. The chat entries in a VDT logically belong to the same "hidden" discussion within a chat session. Use of the VDT enables the SCS 100 to support a user in understanding existing discussions by showing VDTs available in an overall list of chat entries and evidencing the chat entries in a VDT.

The SCS 100 can be utilized in many different types of data processing environments including a distributed data processing environment, a single data processing device, or the like. The SCS 100 includes at least one network 102, which is the medium used to provide communication links between various devices and computers connected together within the SCS 100. The network 102 can include connections, such as wire, wireless communication links, or fiber optic cables. The client computing devices 110, 112, 114 can be, for example, personal computers, network computers, or the like. In the depicted example, the server 104 provides data, such as boot files, operating system images, and applications to the client computing devices 110, 112, and 114. The client computing devices 110, 112, 114 are clients to the server 104 in the depicted example. The SCS 100 may include additional servers, client computing devices, and other devices not shown.

In some embodiment of the invention, the network 102 of the SCS 100 can be the internet as represented by a world-wide collection of networks and gateways that use the transmission control protocol/internet protocol (TCP/IP) suite of protocols to communicate with one another. At the heart of the internet is a backbone of high-speed data communication lines between major nodes or host computers, consisting of thousands of commercial, governmental, educational and other computer systems that route data and messages. In some embodiments of the invention, the network 102 of the SCS 100 can also include a number of different types of networks, such as for example, an intranet, a local area network (LAN), a wide area network (WAN), or the like.

In some embodiments of the invention, the server 104 can be a chat server, and the live-agent 120, the CA 130, and the customer 140 (using their respective client computing device 110, 112, 114) can be participants/clients in a chat. Although not shown, a chat can have only two participants or many participants, perhaps hundreds or more. In some embodiments of the invention, a chat can be any synchronous conferencing, such as a text chat, audio/video conferencing, instant messaging, and the like. Examples of synchronous conferencing technologies that can be utilized by the SCS 100 include internet relay chat (IRC), jabber (XMPP), multi-user dungeons (MUDs), massively multi-player online role playing games (MMORPGs), protocol for synchronous conferencing (PSYC), and web chats.

Generally, chat services can be categorized into two main types, namely, one-to-one chats and group chats. One-to-one chat services, such as instant messaging (IM) services, typically involve chatting between two participants, although some IM services allow more than two participants. Group chats allow hundreds, perhaps thousands, of people to connect at the same time, because messages are broadcast to all the people who are connected to the group or channel. Channels are usually defined based on the topic content and language used by participants, and conversation chat windows can be one for every channel.

In some embodiments of the invention, the server 104 can manage authentication and authorization to access the chat service. The server 104 can also be responsible for the reception and delivery of messages among the connected users. The client computing device 110, for example, provides an interface between the live-agent 120 and the server 104. In some embodiments of the invention, the client computing device 110 provides a chat window where messages are displayed in a chronological list. The chat window can also include a text box in which the user (e.g., User A 120, User B, 130, and/or User C 140) can type a current message or chat entry (CE) for delivery to the server 104. The chat window can further include a display box to present information received from the server 104, such as the number of connected users, nicknames, and the like.

The SCS 100 can be applied as a customer service tool in online ecommerce settings where it is desirable to allow online customers (e.g., User C 140) visiting a merchant's website (e.g., hosted by the server 104 and/or one or more of the client computing devices 110, 112, 114) to immediately initiate an online conversation/chat with a merchant (e.g., User A 120 and/or User B 130). In some embodiments of the invention, the CA 130 is a computer system configured to communicate with a human (and/or another CA) using a coherent structure. The CA 130 can employ a variety of communication mechanisms, including, for example, text, speech, graphics, haptics, gestures, and the like for communication on both the input and output channels. Accordingly, messages exchanged through the SCS 100 can take the form of text, speech, graphics, haptics, gestures, and the like. The CA 130, in accordance with some aspects of the invention, can employ various forms of machine learning techniques with natural language processing (NLP) functionality. In general NLP is a field of computer science, artificial intelligence, and computational linguistics concerned with the interactions between computers and humans using language. Additional details of how the SCS 100, including specifically the CA 130, can be utilized to implement embodiments of the invention are described in greater detail subsequently herein. In some embodiments of the invention, natural language processing (NLP) techniques are utilized with machine learning (ML) algorithms to generate models that perform the various language and text related tasks described herein in accordance with aspects of the invention. In general, NLP/ML models in accordance with embodiments of the invention can be built according to a variety of suitable encoder-decoder architectures.

Figure 2:
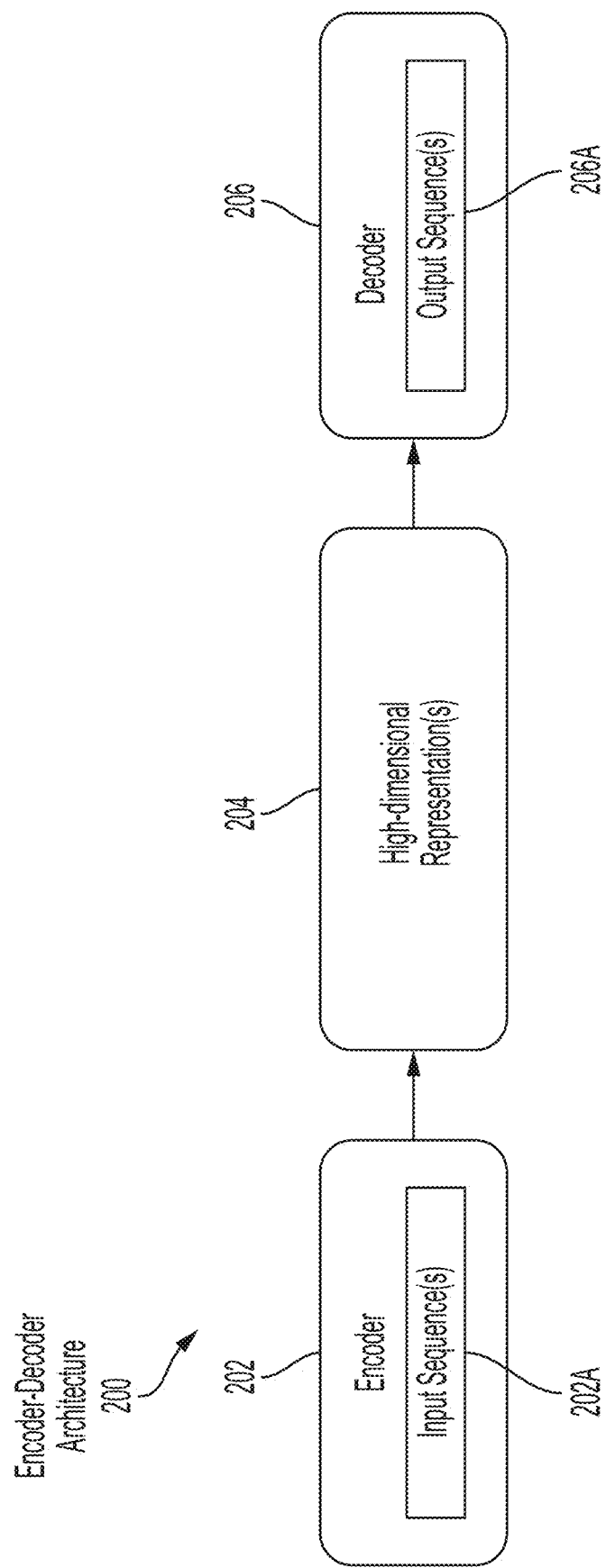
FIG. 2 depicts an encoder-decoder architecture that can be utilized to implement aspects of the invention.

FIG. 2 depicts an encoder-decoder architecture 200 that can be utilized in the SCS 100 (shown in FIG. 1), including specifically the CA 130 (also shown in FIG. 1), to implement machine learning and natural language functionality of the SCS 100 in accordance with some embodiments of the invention. For example, the encoder-decoder architecture 200 and the variations thereof described herein can be used to implement any one or more of the various models described herein, including, for example, the language model 450 (shown in FIG. 4), the language model 502 (shown in FIG. 5A), the language model 558 (shown in FIG. 5B), the language model 560 (shown in FIG. 5C), and/or the classifier 610 and model(s) 616 (shown in FIG. 6A). In general, the encoder-decoder architecture 200 includes an encoder 202 and a decoder 206. The encoder 202 is configured and arranged to take input sequences 202A, for example sentences (i.e., sequences) written in German, and mapping them to high-dimensional representation(s) 204. The encoder 202 is configured to "learn" the parts of the input sequences 202A that are important and pass them to the high-dimensional representation 204, and the less-important aspects of the input sequences 202A are left out. At this stage, the high-dimensional representation 204 cannot be easily understood because there are no semantics involved and the complete mapping has not yet been learned.

The decoder 206 is configured to convert the high-dimensional representation 204 into another sequence, which, in this example, is an output sequence 206A (e.g., a sequence written in English). Utilizing an encoder 202 and a decoder 206 allows models to be built that can transduce (i.e., map without losing semantics) "one way" into "another," e.g., German into English. By training the encoder 202 and the decoder 206 together, a sequence-to-sequence model is created. A sequence-to-sequence model is capable of ingesting a sequence of a particular kind and outputting another sequence of another kind.

In embodiments of the invention, a transformer model (also known as a generative language model), which is a type of encoder-decoder sequence-to-sequence model, can be trained to perform many of the tasks described herein in accordance with aspects of the invention. In a transformer model, the encoder can include a set of encoding layers that processes the input iteratively one layer after another, and the decoder can include a set of decoding layers that does the same thing to the output of the encoder. The function of each transformer encoder layer is to process its input to generate encodings that contain information about which parts of the inputs are relevant to each other. The transformer encoder passes its set of encodings to the next transformer encoder layer as inputs. Each transformer decoder layer does the opposite, taking all the transformer encodings and processing them, using their incorporated contextual information, to generate an output sequence. To achieve this, each transformer encoder layer and transformer decoder layer makes use of an attention mechanism. In the context of neural networks, an attention mechanism is a technique that electronically mimics human cognitive attention. The effect enhances the important parts of the input data and fades out the rest such that the network devotes more computing power on that small but important part of the data. The part of the data that is more important than other parts of the data depends on the context and is learned through training data by gradient descent. Thus, the transformer model's attention mechanism weighs the relevance of every other input and draws information from them accordingly to produce the output. Each transformer decoder layer can include an additional attention mechanism that draws information from the outputs of previous transformer decoders before the transformer decoder layer draws information from the transformer encodings. Both the transformer encoder layers and the transformer decoder layers have a feed-forward neural network for additional processing of the outputs, and also contain residual connections and layer normalization steps.

Transformer models can be autoregressive and/or auto-encoding. Autoregressive transformer models utilize previous predictions to generate a new prediction. Training an autoregressive transformer model therefore involves a language modeling task, which means that the autoregressive transformer model has to learn a language and interdependencies between words and phrases, along with semantics. Text generation is a classic task that can be performed with autoregressive transformer models. On the other hand, autoencoding transformer models corrupt textual inputs and generate the original inputs in return. The result is a transformer encoding that can be used for additional downstream tasks, such as question answering.

Transformer models that perform a sequence-to-sequence, an autoregressive, and/or an autoencoding task do not depend on the transformer model's particular encoder-decoder architecture because the training task can be adapted to the desired task to be performed by the transformer model (e.g., text generation, text understanding, question answer, and the like). Hence, whether a transformer model is autoregressive or autoencoding depends mostly on the nature of the task being performed, as well as on the type of training of training applied to the transformer model to enable the transformer model to perform the desired task.

Thus, it can be seen from the forgoing descriptions that a transformer model suitable for use in accordance with aspects of the invention includes a deep learning model that utilizes the mechanism of attention to weigh the influence of different parts of the input data. Like RNNs, transformer models are designed to handle sequential data, such as natural language, for tasks such as translation, text summarization, text classification, question answer, and the like. However, unlike RNNs, transformer models do not require that the sequential data be processed in order. For example, if the input data is a natural language sentence, a transformer model does not need to process the beginning of the input data before processing the end of the input data. Due to this feature, transformer models allows for much more parallel computing than RNNs. Parallel computing is a type of computation where many calculations or the execution of processes are carried out simultaneously. Large problems can often be divided into smaller ones, which can then be solved at the same time. In the context of training, parallel computing features of transformers enable a reduction in training times for transformer models to be achieved in comparison to the required training times for pre-transformer RNN models such as the long short-term memory (LSTM).

Because transformer models facilitate more parallelization during training, they have enabled training on larger datasets than was possible before transformer models were introduced. This has led to the development of pre-trained systems such as BERT (Bidirectional Encoder Representations from Transformers), and GPT (Generative Pre-trained Transformer), and/or BART (bidirectional and auto-regressive transformer), all of which have been trained with huge general language datasets, and which can be fine-tuned to perform the various specific language tasks described herein in accordance with aspects of the invention. Thus, transformers models can undergo semi-supervised learning involving unsupervised pre-training (e.g., a relatively large dataset) followed by supervised fine-tuning.

BART (bidirectional and auto-regressive transformer) is a pre-trained NLP/ML model that combines bidirectional and auto-regressive transformers. BART uses a standard transformer-based neural machine translation architecture, which includes a de-noising auto-encoder built with a sequence-to-sequence model that is applicable to a range of end tasks. For example, fine-tuned training of BART can be applied to achieve a variety of text generation, comprehension, abstractive dialogue, question answering, and summarization end tasks. Pre-training BART can include two stages, namely, text is corrupted with an arbitrary noising function, and a sequence-to-sequence model is learned in order to reconstruct the original text.

Figure 3:
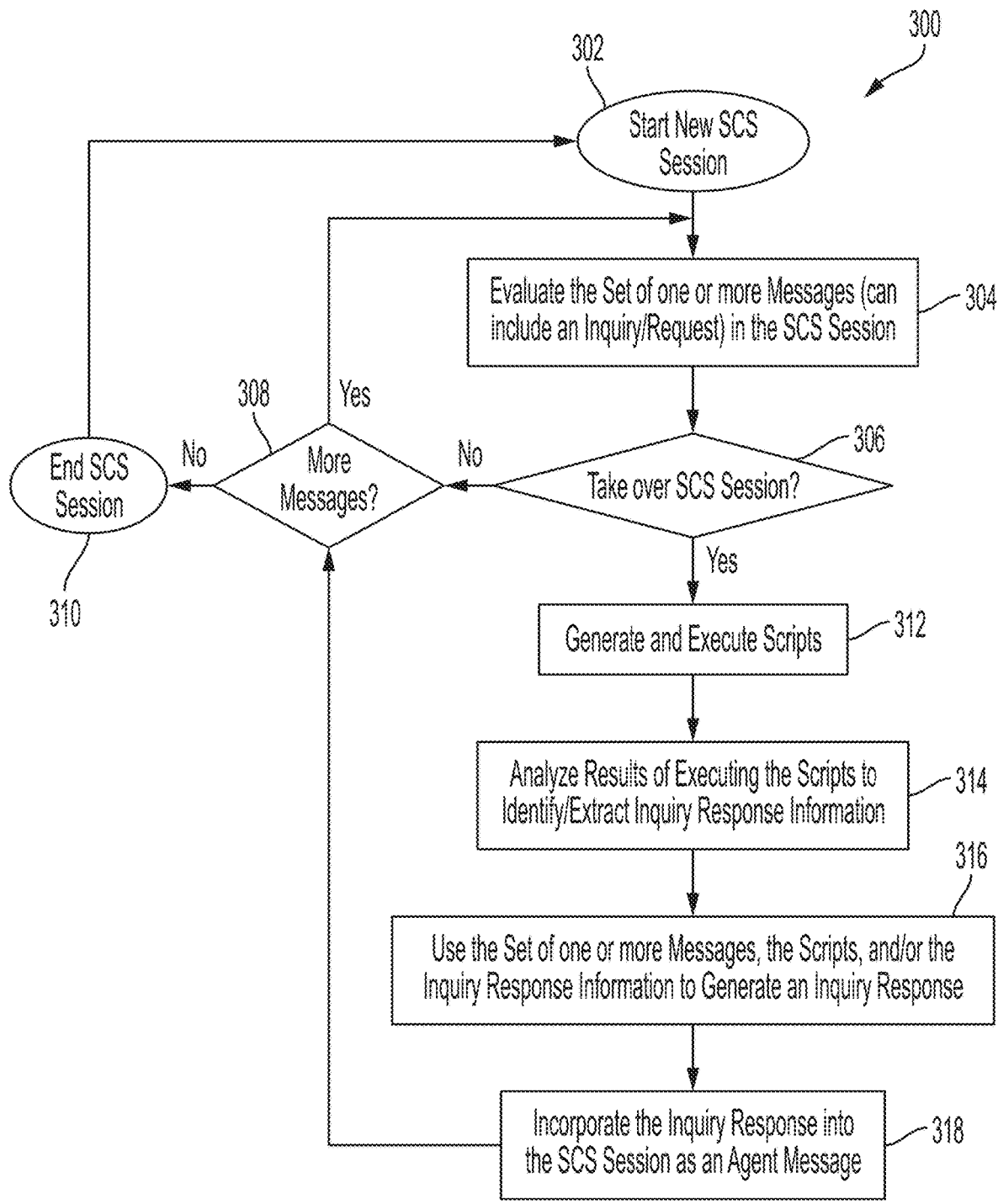
FIG. 3 depicts a flow diagram illustrating a computer-implemented methodology according to embodiments of the invention.

FIG. 3 depicts a flow diagram illustrating a computer-implemented methodology 300 according to embodiments of the invention. The computer-implemented methodology 300 is implemented by the SCS 100 in the course of carrying out the generation and control of messages exchanges over the network 102 between and among the server 104, the storage 108, the client computing devices 110, 112, 114, the User A 120, the User B 130, and the User C 140. Accordingly, the following descriptions of the methodology 300 refer to the flow diagram depicted in FIG. 3, along with the relevant systems, modules, models, engines and the like shown in FIGS. 1 and 4-5C. The methodology 300 begins at block 302 by initiating a new SCS session. As used herein, the terms "SCS session" and variations thereof refers to the grouping of messages exchanged between/among users through an SCS as part of the same conversation to provide context. The messages that make up an SCS session are frequently displayed to each user (e.g., users 120, 130, 140 shown in FIG. 1) within a window in a graphical user interface (GUI) at the user's local computer display (e.g., client computing devices 110, 112, 114 shown in FIG. 4). As an example, the new SCS session initiated at block 302 can begin as an SCS session over the SCS system 100 initiated by the customer 140.

Figure 4:
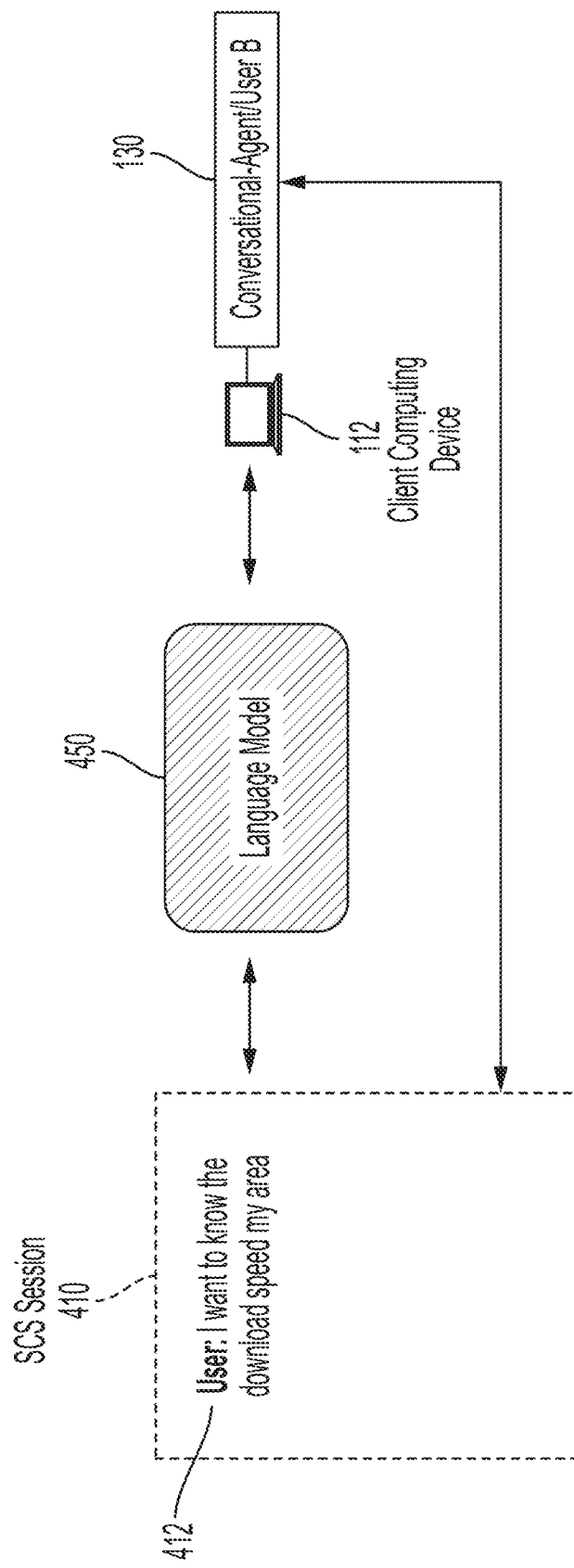
FIG. 4 depicts a block diagram illustrating examples of messages that can be exchanged during an SCS session according to embodiments of the invention.

At block 304 and decision block 306, the methodology 300 evaluates the messages in the SCS session to make a determination that the SCS 100 (and specifically, the SGC-CA 130) can take over the live-agent responsibilities in the new SCS session. FIG. 4 depicts an example of how the SCS 100 can be configured to include a language model 450 trained to analyze messages (e.g., user message 412) in an SCS session 410 to perform the task of determining that the SCS session 410 is within a category of SCS session that can be run by the SGC-CA 130 instead of the live-agent 120. If the language model 450 does not conclude that the SGC-CA 130 can perform live-agent operations in the SCS session 410, the SCS 100 routes the SCS session 410 through the client computing device 110 to the live-agent 120. Returning to the methodology 300, if the answer to the inquiry at decision block 306 is no, the methodology 300 moves to decision block 308 to determine whether there are any more messages in the SCS session. If the answer to the inquiry at decision block 308 is no, the methodology 300 moves to blocks 310 and 302 to end the current SCS session at block 310 and look for a new SCS session at block 302. If the answer to the inquiry at decision block 308 is yes, the methodology 300 moves to block 304 to again evaluate the messages in the SCS session, which now contains new messages as identified by the decision block 308.

Figure 5A:
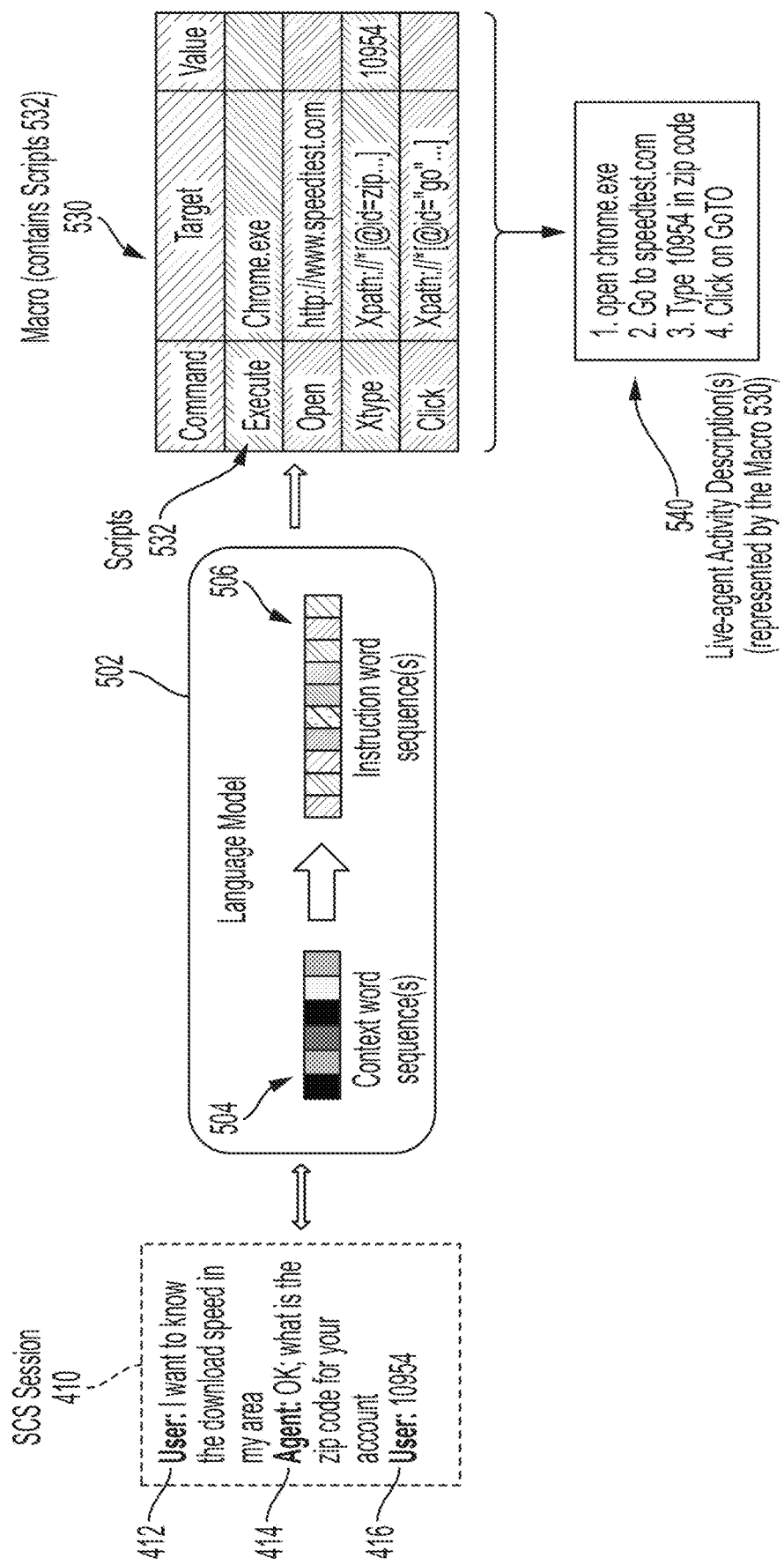
FIG. 5A depicts a block diagram illustrating details of a language model that can be utilized to implement aspects of the invention.

If the answer to the inquiry at decision block 306 is yes, the methodology 300 moves to block 312 where the SCS 100 (and particularly the SGC-CA 130) generates and executes a set of scripts for simulating live-agent actions that can be taken in response to inquiry messages (e.g., user message 412 shown in FIG. 4) in the SCS session. An example of how the script-generating functionality described at block 312 can be implemented using a language model 502 is shown in FIG. 5A. The language model 502 is trained to perform multiple tasks, including advancing the SCS session 410 to the level shown in FIG. 5A by ingesting user message 416 and generating agent message 414, as well as generating scripts 532 that are based on (or conditional to) the information provided in user messages 412, 416. In embodiments of the invention, the language model 502 ingests the user message 412 and evaluates whether or not the user message 412 provides the user inquiry and the information, if any, needed in order to search for and uncover a response to the user inquiry. For example, if the user message 412 reads "I want to know the download speed for my zip code 10954," this example of the user message 412 includes both the user's inquiry, along with the information needed by the language model 502 to begin a process of responding to the user inquiry. In the example depicted in FIG. 5A, the user message 412 reads "I want to know the download speed in my area" without providing the user's zip code, the language model 502 generates the agent message 414, which solicits the information (user message 416) needed by the language model 502.

When the language model 502 has both the user inquiry and the information, if any, needed in order to search for and uncover a response to the user inquiry, the language model 502 executes the task of generating the scripts 532, which can be packaged in a macro 530. In some embodiments of the invention, the script-generating task performed by the language model 502 includes converting the SCS session 410 to the context word sequence 504 then using the context word sequence 504 to generate an instruction word sequence 506. In some embodiments of the invention, the context word sequence 504 can be based on the entire SCS session 410, the user message 412 alone (e.g., where the user message 412 includes the user inquiry and information, if any, needed by the language model 502 to search for a response to the user inquiry), and/or the user messages 412, 414, which provide both the user inquiry and the information needed by the language model 502 to search for a response to the user inquiry. In some embodiments of the invention, using the context word sequence 504 to generate the instruction word sequence 506 can be implemented using, for example, the encoder-decoder architecture 200 (shown in FIG. 2), wherein the context word sequence 504 corresponds to the input sequence 202A, and wherein the instruction word sequence 506 corresponds to the output sequence 206A. In some embodiments of the invention, the language model 502 is trained to incorporate code generation functionality into the task of converting the context work sequence 504 to the instruction word sequence 506, wherein the context work code sequence 504 is first converted to natural language descriptions of the code (e.g., live-agent activity descriptions 540) then code generation techniques convert the natural language descriptions of the code to the instruction word sequences 506. The language model 502 then converts the instruction word sequence 506 to the scripts 532, which can be packaged by the model 502 into the macro 530.

Figure 5B:
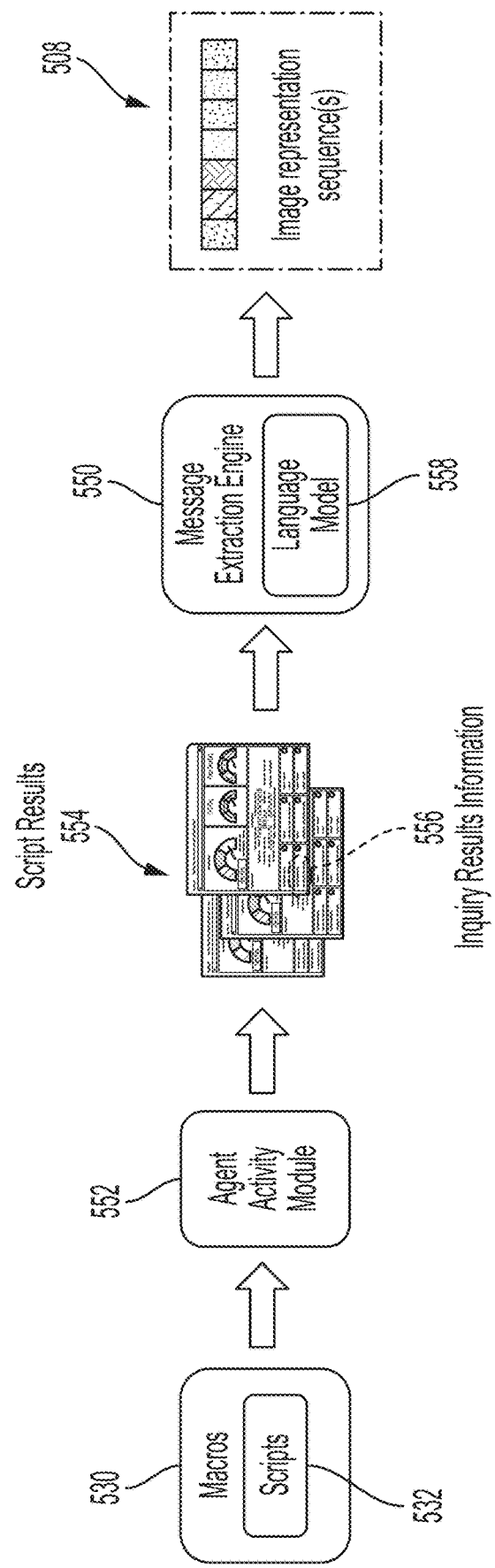
FIG. 5B depicts a block diagram illustrating details of a message extraction engine that can be utilized to implement aspects of the invention.

An example of how the script-executing functionality described at block 312 can be implemented using an agent activity model 552 is shown in FIG. 5B. The agent activity module 552 is configured to receive the macros 530 and execute the instructions defined in the scripts 532. In some embodiment of the invention, the agent activity model 552 can be implemented as a so-called robotic process automation (RPA) algorithm, configured and arranged to execute the scripts 532, thereby emulating the live-agent actions (e.g., live-agent activity descriptions 540 shown in FIG. 5A) that would have been performed by the live-agent 120 using the client computing device 110 to generate a response to the user inquiry 412. After the agent activity module 552 executes the scripts, script results 554 can be generated. In some embodiments of the invention, the script results 554 are text, graphical, and diagrammatic information that can be shown on a display of the client computing device 112, and that includes inquiry results information 556 that is responsive to the user inquiry 412.

Returning to the methodology 300, block 314 analyzes the results of executing the scripts to identify and extract from the results of executing the scripts inquiry response information. An example of how block 314 can be implemented using a message extraction engine 550 is shown in FIG. 5B, where the agent activity module 552 executes the scripts 532 to generate script results 554 having inquiry results information 556. The message extraction engine 550 is used to extract the inquiry results information 554 from the script results 552. In some embodiments of the invention, the script results 554 include computer images, the inquiry results information 556 is be embedded within the script results 554, and the message extraction engine 550 includes optical character recognition (OCR) functionality configured and arranged to extract the inquiry results information 556 from the script results 554. and convert image regions of text (e.g., inquiry results information 556) into editable text. generate an image representation sequence 508 that represents the inquiry results information 554 in a manner that can be processed and analyzed by downstream language models (e.g., language model 560 shown in FIG. 5C) of the SGC-CA 130. A language model 558 of the message extraction engine 550 is configured and arranged to convert the inquiry results information 556 to the image representation sequence 508. In the example depicted in FIGS. 5A and 5B wherein the user inquiry is user message 412, the inquiry results information 556 is 300 megabits/second (MB/s) (e.g., inquiry results information 556A shown in FIG. 5C).

Figure 5C:
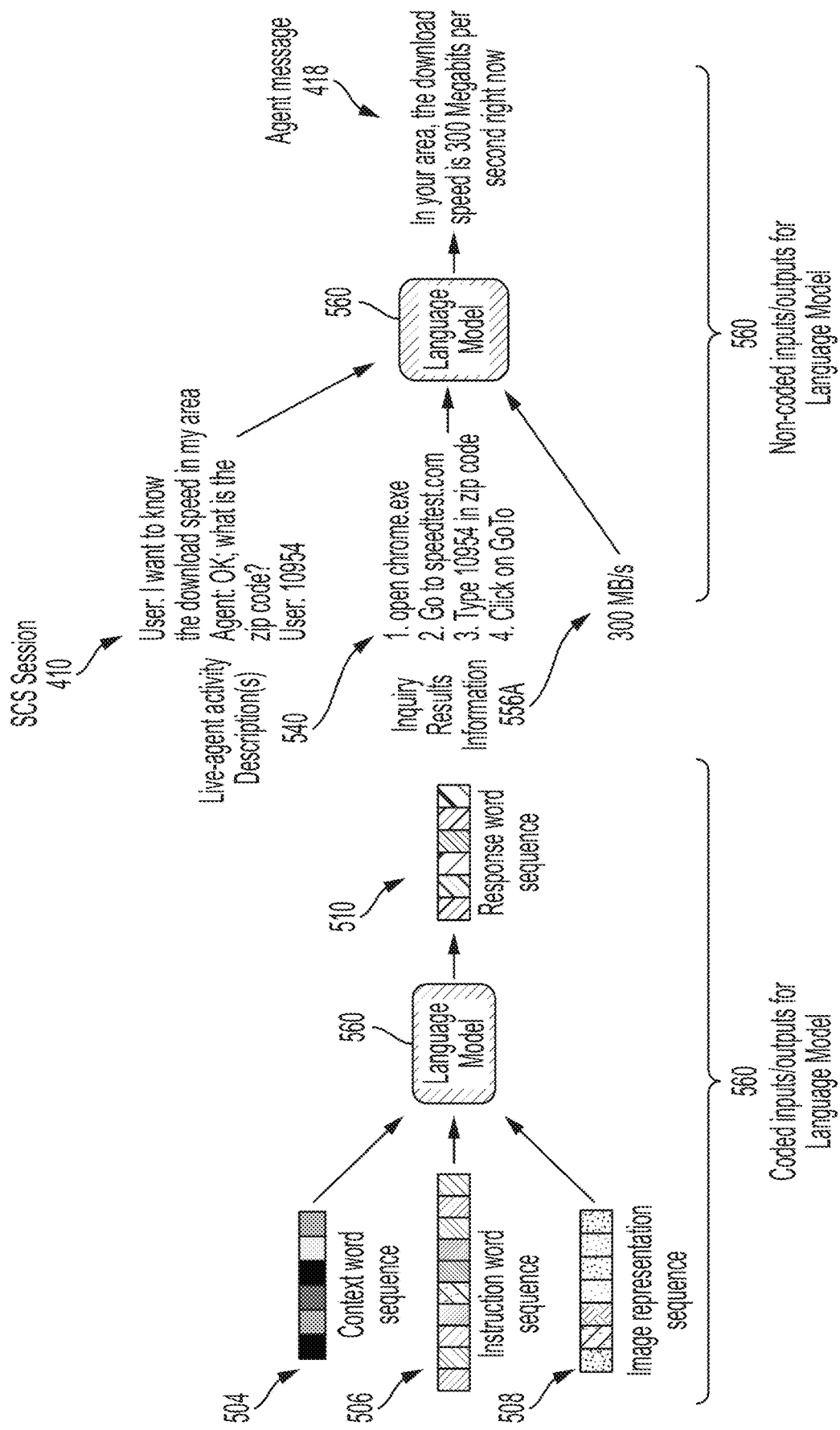
FIG. 5C depicts a block diagram illustrating details of another language model that can be utilized to implement aspects of the invention.
Figure 5D:
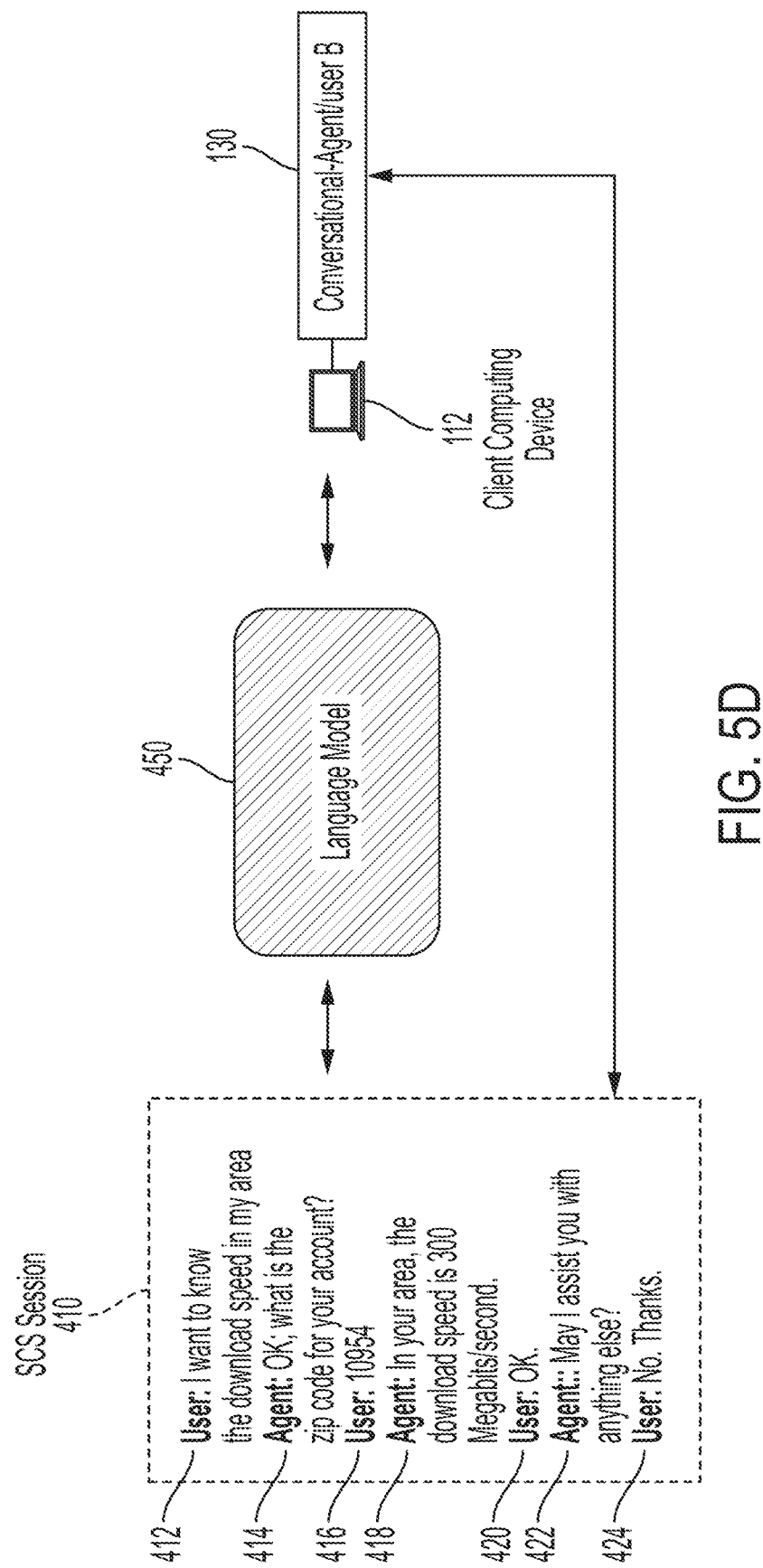
FIG. 5D depicts a block diagram illustrating additional details of the language model shown in FIG. 5A.

Returning to the methodology 300, blocks 316, 318 use the messages in the SCS session so far, the scripts, and/or the inquiry response information, in any combination, to generate an inquiry response and incorporate the inquiry response into the SCS session. FIG. 5C depicts two diagrams showing examples of how blocks 316, 318 can be implemented using a language model 560. In the leftmost diagram, the inputs/outputs to the language model 560 are shown in their coded form. In the rightmost diagram, the inputs/outputs to the language model 560 are shown in their non-coded, NL form. As shown in the leftmost diagram, the language model 560 is trained to receive as input sequence(s) (e.g., input sequence(s) 202A shown in FIG. 2), in any combination, the context word sequence 504, the instruction word sequence 506, and the image representation sequence 508. In response to the input sequence(s), the language model 560 generates as output sequence(s) (e.g., output sequence(s) 206A shown in FIG. 2) a response word sequence 510 that represents an agent message 418 (shown in the rightmost diagram) generated by the language model 560 of the SGC-CA 130 (shown in FIG. 1). As shown in the rightmost diagram, the language model is trained to receive as input sequence(s) (e.g., input sequence(s) 202A shown in FIG. 2), in any combination, some or all of the messages in the SCS session 410, the live-agent activity descriptions 540, and the inquiry results information 556A. In response to the input sequence(s), the language model 560 generates as output sequence(s) (e.g., output sequence(s) 206A shown in FIG. 2) the agent message 418 generated by the language model 560 of the SGC-CA 130 (shown in FIG. 1).

At block 318, the methodology 300 incorporates the inquiry response into the agent messages that make up the current SCS session then moves to decision block 308 to determine that additional messages (other than agent messages added at block 318) have been added to the current SCS session. If the answer to the inquiry at decision block 308 is no, the methodology 300 moves to blocks 310 and 302 to end the current SCS session at block 310 and look for a new SCS session at block 302. If the answer to the inquiry at decision block 308 is yes, the methodology 300 moves to block 304 to again evaluate the messages in the SCS session, which now contains new messages as identified by the yes result of the inquiry at decision block 308 and the operations at block 318. The completion of the methodology 300 is depicted by the diagram shown in FIG. 5D, which illustrates that, in comparison to the diagram shown in FIG. 4, the SGC-CA 130 has completed the agent responses 414, 418, 422 of the SCS session 410 in accordance with embodiments of the invention.

Additional details of machine learning techniques that can be used to implement aspects of the invention disclosed herein will now be provided. The various types of computer control functionality of the processors described herein can be implemented using machine learning and/or natural language processing techniques. In general, machine learning techniques are run on so-called "neural networks," which can be implemented as programmable computers configured to run sets of machine learning algorithms and/or natural language processing algorithms. Neural networks incorporate knowledge from a variety of disciplines, including neurophysiology, cognitive science/psychology, physics (statistical mechanics), control theory, computer science, artificial intelligence, statistics/mathematics, pattern recognition, computer vision, parallel processing and hardware (e.g., digital/analog/VLSI/optical).

The basic function of neural networks and their machine learning algorithms is to recognize patterns by interpreting unstructured sensor data through a kind of machine perception. Unstructured real-world data in its native form (e.g., images, sound, text, or time series data) is converted to a numerical form (e.g., a vector having magnitude and direction) that can be understood and manipulated by a computer. The machine learning algorithm performs multiple iterations of learning-based analysis on the real-world data vectors until patterns (or relationships) contained in the real-world data vectors are uncovered and learned. The learned patterns/relationships function as predictive models that can be used to perform a variety of tasks, including, for example, classification (or labeling) of real-world data and clustering of real-world data. Classification tasks often depend on the use of labeled datasets to train the neural network (i.e., the model) to recognize the correlation between labels and data. This is known as supervised learning. Examples of classification tasks include identifying objects in images (e.g., stop signs, pedestrians, lane markers, etc.), recognizing gestures in video, detecting voices, detecting voices in audio, identifying particular speakers, transcribing speech into text, and the like. Clustering tasks identify similarities between objects, which they group according to those characteristics in common and which differentiate them from other groups of objects. These groups are known as "clusters."

An example of machine learning techniques that can be used to implement aspects of the invention will be described with reference to FIGS. 6A and 7. Machine learning models configured and arranged according to embodiments of the invention will be described with reference to FIG. 6A. Detailed descriptions of an example computing system and network architecture capable of implementing one or more of the embodiments of the invention described herein will be provided with reference to FIG. 8.

Figure 6A:
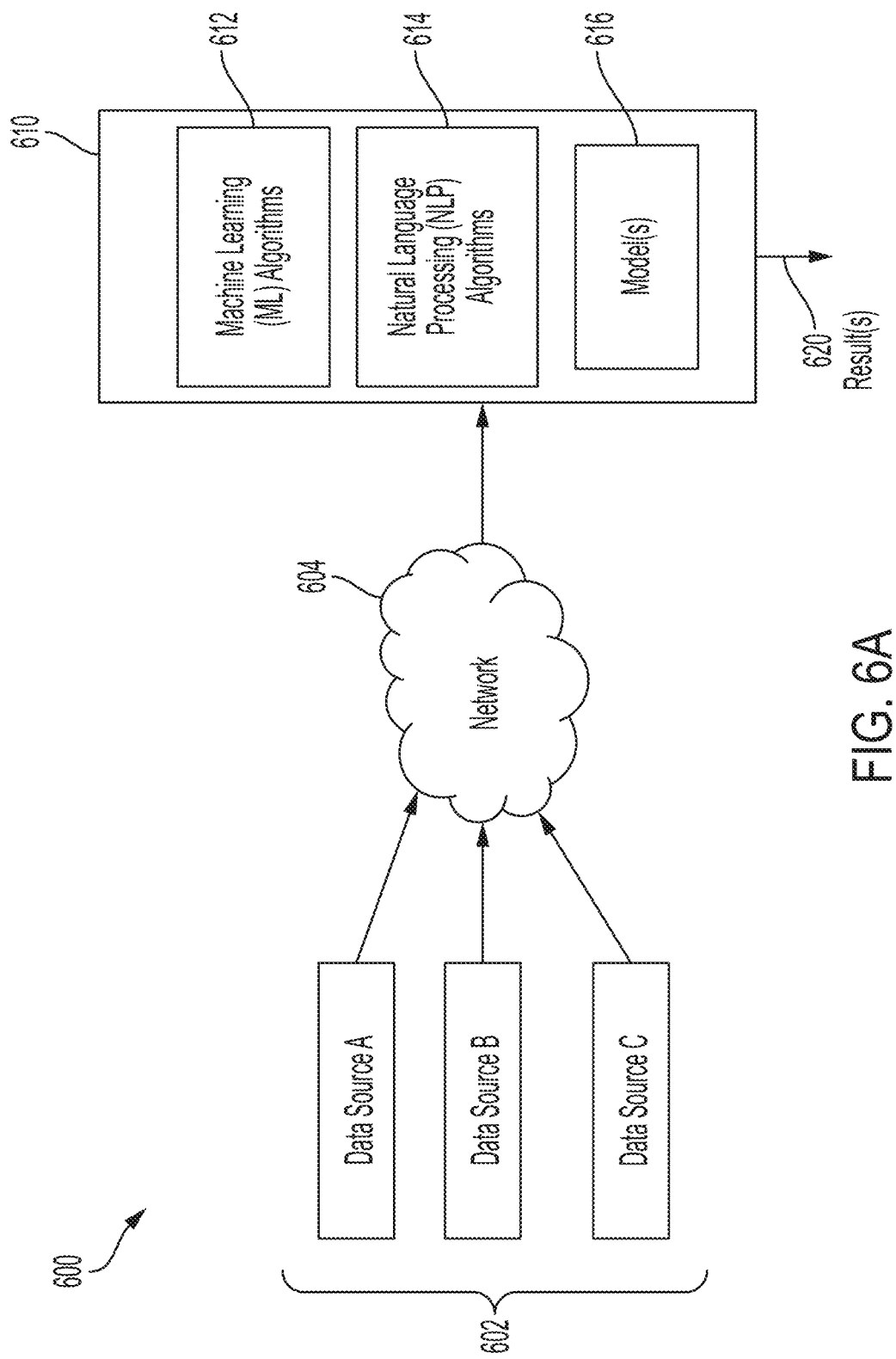
FIG. 6A depicts a machine learning system that can be utilized to implement aspects of the invention.

FIG. 6A depicts a block diagram showing a classifier system 600 capable of implementing various aspects of the invention described herein. More specifically, the functionality of the system 600 is used in embodiments of the invention to generate various models and/or sub-models that can be used to implement computer functionality in embodiments of the invention. The system 600 includes multiple data sources 602 in communication through a network 604 with a classifier 610. In some aspects of the invention, the data sources 602 can bypass the network 604 and feed directly into the classifier 610. The data sources 602 provide data/information inputs that will be evaluated by the classifier 610 in accordance with embodiments of the invention. The data sources 602 also provide data/information inputs that can be used by the classifier 610 to train and/or update model(s) 616 created by the classifier 610. The data sources 602 can be implemented as a wide variety of data sources, including but not limited to, sensors configured to gather real time data, data repositories (including training data repositories), and outputs from other classifiers. The network 604 can be any type of communications network, including but not limited to local networks, wide area networks, private networks, the Internet, and the like.

Figure 8:
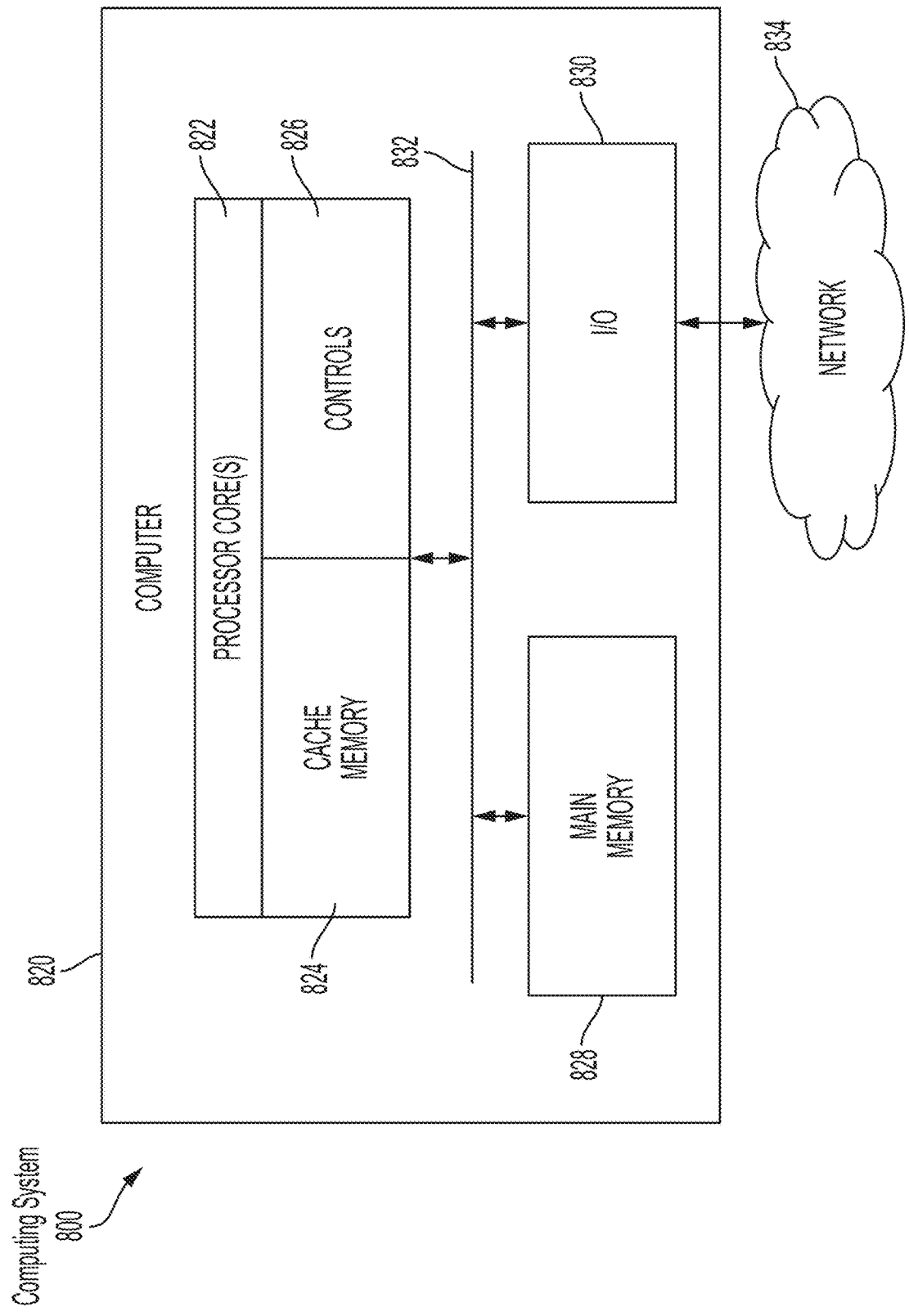
FIG. 8 depicts details of an exemplary computing system capable of implementing various aspects of the invention.

The classifier 610 can be implemented as algorithms executed by a programmable computer such as a processing system 800 (shown in FIG. 8). As shown in FIG. 6A, the classifier 610 includes a suite of machine learning (ML) algorithms 612; natural language processing (NLP) algorithms 614; and model(s) 616 that are relationship (or prediction) algorithms generated (or learned) by the ML algorithms 612. The algorithms 612, 614, 616 of the classifier 610 are depicted separately for ease of illustration and explanation. In embodiments of the invention, the functions performed by the various algorithms 612, 614, 616 of the classifier 610 can be distributed differently than shown. For example, where the classifier 610 is configured to perform an overall task having sub-tasks, the suite of ML algorithms 612 can be segmented such that a portion of the ML algorithms 612 executes each sub-task and a portion of the ML algorithms 612 executes the overall task. Additionally, in some embodiments of the invention, the NLP algorithms 614 can be integrated within the ML algorithms 612.

The NLP algorithms 614 include speech recognition functionality that allows the classifier 610, and more specifically the ML algorithms 612, to receive natural language data (text and audio) and apply elements of language processing, information retrieval, and machine learning to derive meaning from the natural language inputs and potentially take action based on the derived meaning. The NLP algorithms 614 used in accordance with aspects of the invention can also include speech synthesis functionality that allows the classifier 610 to translate the result(s) 620 into natural language (text and audio) to communicate aspects of the result(s) 620 as natural language communications.

The NLP and ML algorithms 614, 612 receive and evaluate input data (i.e., training data and data-under-analysis) from the data sources 602. The ML algorithms 612 include functionality that is necessary to interpret and utilize the input data's format. For example, where the data sources 602 include image data, the ML algorithms 612 can include visual recognition software configured to interpret image data. The ML algorithms 612 apply machine learning techniques to received training data (e.g., data received from one or more of the data sources 602) in order to, over time, create/train/update one or more models 616 that model the overall task and the sub-tasks that the classifier 610 is designed to complete.

Figure 6B:
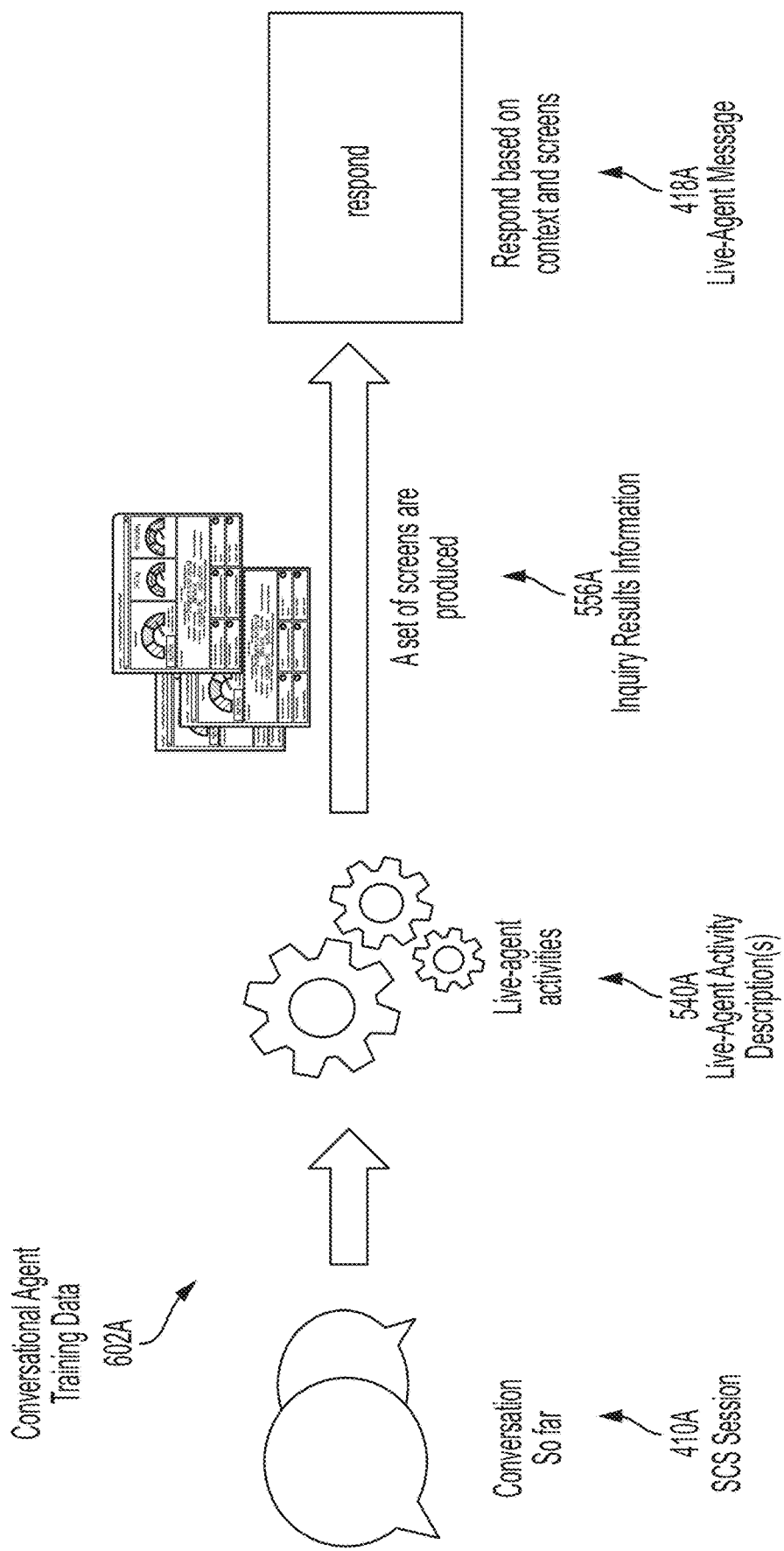
FIG. 6B depicts an example of training data that can be used to train the various models described and illustrated herein in accordance with aspects of the invention.

FIG. 6B depicts an example of conversational agent data 602A, which corresponds to the training data 602 shown in FIG. 6A, and which can be utilized to train the various language models used in the SGC-CA 130 in accordance with aspects of the invention. In aspects of the invention, the various language models that support the functionality of the SGC-CA 130 can be trained to support various categories of the SCS sessions 410. In some embodiments of the invention, the SCS session categories can each be based at least in part on an assessment that the category involves a level of live-agent cognitive determinations that are beyond what can be efficiently implemented in a rule-based CA; and the category involves a level of live-agent cognitive determinations that are not so complex that they would be more efficiently and/or effectively be performed by a live-agent. For training purposes, the conversational agent training data 602A is a live-agent run SCS session, and data of the live-agent run SCS session are gathered and labeled. In embodiments of the invention, the labeled data of the live-agent run SCS session depicted in FIG. 6B can include, but are not limited to, data that identifies the "conversation so far," which corresponds to a live-agent run SCS session 410A; data that identifies the live-agent activities, which corresponds to live-agent activity descriptions 540A; data that identifies outputs (e.g., "a set of screens produced") that are generated in response to the live-agent activities performed by the live-agent during the live-agent run SCS session, which corresponds to inquiry results information 556A; and data that identifies "responses" generated by the live-agent based on the outputs generated in response to the live-agent activities performed by the live-agent during the live-agent run SCS session, which corresponds to the live-agent message 418A. The labeled conversational training data 602A is used to train the various language models that support the functionality of the SGC-CA 130 in executing live-agent responsibilities for SCS sessions. In some embodiments of the invention, the training is applied to language models that have not been pre-trained. In some embodiments of the invention, the training is so-called "fine-tuned" training applied to pre-trained models, examples of which include the previously-described transformer model architectures such as BERT, GPT, GPT1, GPT2, BART, and the like.

Figure 7:
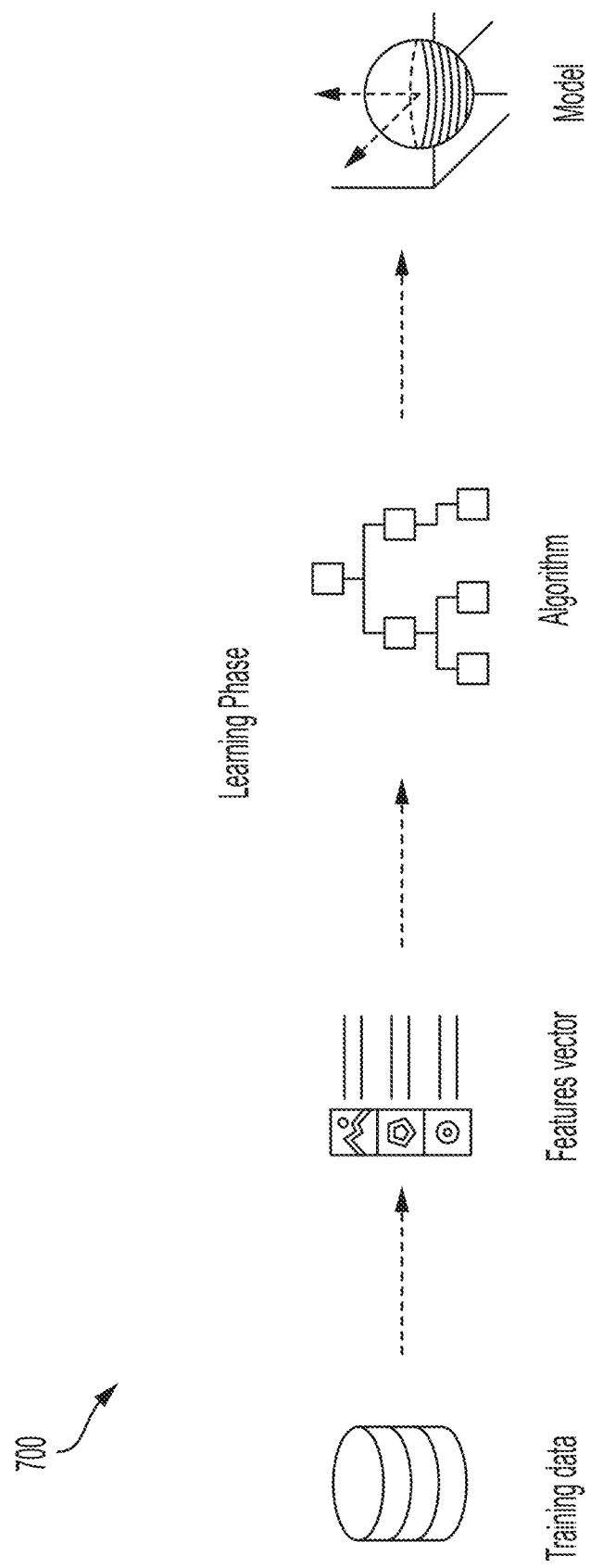
FIG. 7 depicts a learning phase that can be implemented by the machine learning system shown in FIG. 6A.

Referring now to FIGS. 6A and 7 collectively, FIG. 7 depicts an example of a learning phase 700 performed by the ML algorithms 612 to generate the above-described models 616. In the learning phase 700, the classifier 610 extracts features from the training data and coverts the features to vector representations that can be recognized and analyzed by the ML algorithms 612. The features vectors are analyzed by the ML algorithm 612 to "classify" the training data against the target model (or the model's task) and uncover relationships between and among the classified training data. Examples of suitable implementations of the ML algorithms 612 include but are not limited to neural networks, support vector machines (SVMs), logistic regression, decision trees, hidden Markov Models (HMMs), etc. The learning or training performed by the ML algorithms 612 can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier 610 and the ML algorithms 612. Unsupervised learning can utilize additional learning/training methods including, for example, clustering, anomaly detection, neural networks, deep learning, and the like.

When the models 616 are sufficiently trained by the ML algorithms 612, the data sources 602 that generate "real world" data are accessed, and the "real world" data is applied to the models 616 to generate usable versions of the results 620. In some embodiments of the invention, the results 620 can be fed back to the classifier 610 and used by the ML algorithms 612 as additional training data for updating and/or refining the models 616.

In aspects of the invention, the ML algorithms 612 and the models 616 can be configured to apply confidence levels (CLs) to various ones of their results/determinations (including the results 620) in order to improve the overall accuracy of the particular result/determination. When the ML algorithms 612 and/or the models 616 make a determination or generate a result for which the value of CL is below a predetermined threshold (TH) (i.e., CL<TH), the result/determination can be classified as having sufficiently low "confidence" to justify a conclusion that the determination/result is not valid, and this conclusion can be used to determine when, how, and/or if the determinations/results are handled in downstream processing. If CL>TH, the determination/result can be considered valid, and this conclusion can be used to determine when, how, and/or if the determinations/results are handled in downstream processing. Many different predetermined TH levels can be provided. The determinations/results with CL>TH can be ranked from the highest CL>TH to the lowest CL>TH in order to prioritize when, how, and/or if the determinations/results are handled in downstream processing.

In aspects of the invention, the classifier 610 can be configured to apply confidence levels (CLs) to the results 620. When the classifier 610 determines that a CL in the results 620 is below a predetermined threshold (TH) (i.e., CL<TH), the results 620 can be classified as sufficiently low to justify a classification of "no confidence" in the results 620. If CL>TH, the results 620 can be classified as sufficiently high to justify a determination that the results 620 are valid. Many different predetermined TH levels can be provided such that the results 620 with CL>TH can be ranked from the highest CL>TH to the lowest CL>TH.

The functions performed by the classifier 610, and more specifically by the ML algorithm 612, can be organized as a weighted directed graph, wherein the nodes are artificial neurons (e.g. modeled after neurons of the human brain), and wherein weighted directed edges connect the nodes. The directed graph of the classifier 610 can be organized such that certain nodes form input layer nodes, certain nodes form hidden layer nodes, and certain nodes form output layer nodes. The input layer nodes couple to the hidden layer nodes, which couple to the output layer nodes. Each node is connected to every node in the adjacent layer by connection pathways, which can be depicted as directional arrows that each has a connection strength. Multiple input layers, multiple hidden layers, and multiple output layers can be provided. When multiple hidden layers are provided, the classifier 610 can perform unsupervised deep-learning for executing the assigned task(s) of the classifier 610.

Similar to the functionality of a human brain, each input layer node receives inputs with no connection strength adjustments and no node summations. Each hidden layer node receives its inputs from all input layer nodes according to the connection strengths associated with the relevant connection pathways. A similar connection strength multiplication and node summation is performed for the hidden layer nodes and the output layer nodes.

The weighted directed graph of the classifier 610 processes data records (e.g., outputs from the data sources 602) one at a time, and it "learns" by comparing an initially arbitrary classification of the record with the known actual classification of the record. Using a training methodology knows as "back-propagation" (i.e., "backward propagation of errors"), the errors from the initial classification of the first record are fed back into the weighted directed graphs of the classifier 610 and used to modify the weighted directed graph's weighted connections the second time around, and this feedback process continues for many iterations. In the training phase of a weighted directed graph of the classifier 610, the correct classification for each record is known, and the output nodes can therefore be assigned "correct" values. For example, a node value of "1" (or 0.9) for the node corresponding to the correct class, and a node value of "0" (or 0.1) for the others. It is thus possible to compare the weighted directed graph's calculated values for the output nodes to these "correct" values, and to calculate an error term for each node (i.e., the "delta" rule). These error terms are then used to adjust the weights in the hidden layers so that in the next iteration the output values will be closer to the "correct" values.

FIG. 8 illustrates an example of a computer system 800 that can be used to implement any of the computer-based components of the various embodiments of the invention described herein. The computer system 800 includes an exemplary computing device ("computer") 802 configured for performing various aspects of the content-based semantic monitoring operations described herein in accordance aspects of the invention. In addition to computer 802, exemplary computer system 800 includes network 814, which connects computer 802 to additional systems (not depicted) and can include one or more wide area networks (WANs) and/or local area networks (LANs) such as the Internet, intranet(s), and/or wireless communication network(s). Computer 802 and additional system are in communication via network 814, e.g., to communicate data between them.

Exemplary computer 802 includes processor cores 804, main memory ("memory") 810, and input/output component(s) 812, which are in communication via bus 803. Processor cores 804 includes cache memory ("cache") 806 and controls 808, which include branch prediction structures and associated search, hit, detect and update logic, which will be described in more detail below. Cache 806 can include multiple cache levels (not depicted) that are on or off-chip from processor 804. Memory 810 can include various data stored therein, e.g., instructions, software, routines, etc., which, e.g., can be transferred to/from cache 806 by controls 808 for execution by processor 804. Input/output component(s) 812 can include one or more components that facilitate local and/or remote input/output operations to/from computer 802, such as a display, keyboard, modem, network adapter, etc. (not depicted).

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

As used herein, in the context of machine learning algorithms, the terms "input data," and variations thereof are intended to cover any type of data or other information that is received at and used by the machine learning algorithm to perform training, learning, and/or classification operations.

As used herein, in the context of machine learning algorithms, the terms "training data," and variations thereof are intended to cover any type of data or other information that is received at and used by the machine learning algorithm to perform training and/or learning operations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be understood that those skilled in the art, both now and in the future, may make various improvements and enhancements which fall within the scope of the claims which follow.

What is claimed is:

1. A computer-implemented method of responding to an inquiry received electronically at a synchronous conferencing system (SCS), the computer-implemented method comprising:
   passing messages from a user into an SCS during an SCS session;
   based at least in part on a recognition that the messages include a first type of user inquiry comprising a first user inquiry complexity level that can be understood and processed using a first alternative operation mode operable to occur between the user and a first agent, switching the SCS session to the first alternate operation mode comprising:
      using a processor of the SCS to generate a script comprising one or more script computer instructions operable to perform cognitive determinations have a first complexity level that can analyze the first type of user inquiry comprising the first user inquiry complexity level;
      using the processor to execute the script computer instructions to generate script computer instruction results, wherein the script computer instruction results comprise inquiry response information that is responsive to the first type of user inquiry; and
      based at least in part on the first type of user inquiry and the inquiry response information, using the processor to generate an inquiry response from the second agent that is responsive to the first type of user inquiry.

2. The computer-implemented method of claim 1, wherein:
   the one or more script computer instructions, when executed by the processor, simulate live-agent processor control actions; and
   the live-agent processor control actions comprise processor control actions that can be taken by a live agent during an attempt by the live agent to utilize the processor to generate the inquiry response information.

3. The computer-implemented method of claim 1, wherein:
   based at least in part on a recognition that the messages include a second type of user inquiry comprising a second user inquiry complexity level that can be understood and processed using a second alternative operation mode operable to occur between the user and a second agent that is different from the first agent, switching the SCS session to the second alternate operation mode;
   wherein the second agent comprises a person who performs cognitive determinations having a second complexity level that can analyze the second type of user inquiry comprising the second user inquiry complexity level; and
   wherein the second complexity level is greater than the first complexity level.

4. The computer-implemented method of claim 1, wherein:
   the processor comprises a first model trained to perform a first task; and
   the first task comprises generating the script based at least in part on the recognition that the messages include the first type of user inquiry that can be understood and processed using the alternative operation mode operable to occur between the user and the second agent that is different from the first agent.

5. The computer-implemented method of claim 4, wherein:
   the processor further comprises a second model trained to perform a second task; and
   the second task comprises generating the inquiry response based at least in part on the first type of user inquiry and the inquiry response information.

6. The computer-implemented method of claim 4, wherein:
   the processor further comprises a second model trained to perform a second task; and
   the second task comprises generating the inquiry response based at least in part on the first type of user inquiry, the one or more script computer instructions, and the inquiry response information.

7. The computer-implemented method of claim 3, wherein:
   based at least in part on a recognition that the messages include a third type of user inquiry comprising a third user inquiry complexity level that can be understood and processed using a third alternative operation mode operable to occur between the user and third agent that is different from the first agent and the second agent, switching the SCS session to the third alternate operation mode;
   wherein the third agent is operable to perform rule-based determinations having a third complexity level that can analyze the third type of user inquiry comprising the third user inquiry complexity level;
   wherein the second complexity level is greater than the first complexity level and the third complexity level;
   wherein the third alternative operating mode cannot analyze the second type of user inquiry; and
   wherein the third alternative operating mode cannot analyze the first type of user inquiry.

8. A computer system of a synchronous conferencing system (SCS), the computer system for responding to an inquiry received electronically at the computer system, the computer system comprising a memory communicatively coupled to a processor, wherein the processor is configured to perform processor operations comprising:
   passing messages from a user into the SCS during an SCS session;
   based at least in part on a determination that the messages include a first type of user inquiry comprising a first user inquiry complexity level, switching the SCS session to an alternate operation mode comprising:
      generating a script comprising one or more script computer instructions operable to perform cognitive determinations have a first complexity level that can analyze the first type of user inquiry comprising the first user inquiry complexity level;
      executing the script computer instructions to generate script computer instruction results, wherein the script computer instruction results comprise inquiry response information that is responsive to the first type of user inquiry; and
      based at least in part on the first type of user inquiry and the inquiry response information, generating an inquiry response that is responsive to the first type of user inquiry.

9. The computer system of claim 8, wherein:
the one or more script computer instructions, when executed by the processor, simulate live-agent processor control actions; and
the live-agent processor control actions comprise processor control actions that can be taken by a live agent during an attempt by the live agent to utilize the processor to generate the inquiry response information.

10. The computer system of claim 8, wherein:
based at least in part on a determination that the messages include a second type of user inquiry comprising a second user inquiry complexity level that can be understood and processed using a second alternative operation mode operable to occur between the user and third agent that is different from the first agent and the second agent, switching the SCS session to the second alternate operation mode;
wherein the third agent comprises a person who performs cognitive determinations having a second complexity level that can analyze the second type of user inquiry comprising the second user inquiry complexity level; and
wherein the second complexity level is greater than the first complexity level.

11. The computer system of claim 8, wherein:
the processor comprises a first model that performs a first task; and
the first task comprises generating the script based at least in part on the determination that the messages include the first type of user inquiry.

12. The computer system of claim 11, wherein:
the processor further comprises a second model that performs a second task; and
the second task comprises generating the inquiry response based at least in part on the first type of user inquiry and the inquiry response information.

13. The computer system of claim 11, wherein:
the processor further comprises a second model that performs a second task; and
the second task comprises generating the inquiry response based at least in part on the first type of user inquiry, the one or more script computer instructions, and the inquiry response information.

14. The computer system of claim 10, wherein:
based at least in part on a recognition that the messages include a third type of user inquiry comprising a third user inquiry complexity level that can be understood and processed using a third alternative operation mode operable to occur between the user and third agent that is different from the first agent and the second agent, switching the SCS session to the third alternate operation mode;
wherein the third agent is operable to perform rule-based determinations having a third complexity level that can analyze the third type of user inquiry comprising the third user inquiry complexity level;
wherein the second complexity level is greater than the first complexity level and the third complexity level;
wherein the third alternative operating mode cannot analyze the second type of user inquiry; and
wherein the third alternative operating mode cannot analyze the first type of user inquiry.

15. A computer program product of a synchronous conferencing system (SCS), the computer program product for responding to an inquiry received electronically at a processor, the computer program product comprising a computer readable program stored on a computer readable storage medium, wherein the computer readable program, when executed on the processor, causes the processor to perform a method comprising:
passing messages from a user into the SCS during an SCS session;
based at least in part on a determination that the messages include a first type of user inquiry comprising a first user inquiry complexity level, switching the SCS session to an alternative operating mode comprising:
generating a script comprising one or more script computer instructions operable to perform cognitive determinations have a first complexity level that can analyze the first type of user inquiry comprising the first user inquiry complexity level;
executing the script computer instructions to generate script computer instruction results, wherein the script computer instruction results comprise inquiry response information that is responsive to the first type of user inquiry; and
based at least in part on the first type of user inquiry and the inquiry response information, generating an inquiry response that is responsive to the first type of user inquiry.

16. The computer program product of claim 15, wherein:
the one or more script computer instructions, when executed by the processor, simulate live-agent processor control actions; and
the live-agent processor control actions comprise processor control actions that can be taken by a live agent during an attempt by the live agent to utilize the processor to generate the inquiry response information.

17. The computer program product of claim 15, wherein:
based at least in part on a determination that the messages include a second type of user inquiry comprising a second user inquiry complexity level that can be understood and processed using a second alternative operation mode operable to occur between the user and third agent that is different from the first agent and the second agent, switching the SCS session to the second alternate operation mode;
wherein the third agent comprises a person who performs cognitive determinations having a second complexity level that can analyze the second type of user inquiry comprising the second user inquiry complexity level; and
wherein the second complexity level is greater than the first complexity level.

18. The computer program product of claim 15, wherein:
the processor comprises a first model that performs a first task; and
the first task comprises generating the script based at least in part on the first type of user inquiry.

19. The computer program product of claim 18, wherein:
the processor further comprises a second model that performs a second task; and
the second task comprises generating the inquiry response based at least in part on the first type of user inquiry, the one or more script computer instructions, and the inquiry response information.

20. The computer program product of claim 17, wherein:
based at least in part on a recognition that the messages include a third type of user inquiry comprising a third user inquiry complexity level that can be understood and processed using a third alternative operation mode operable to occur between the user and third agent that is different from the first agent and the second agent, switching the SCS session to the third alternate operation mode;

wherein the third agent is operable to perform rule-based determinations having a third complexity level that can analyze the third type of user inquiry comprising the third user inquiry complexity level;

wherein the second complexity level is greater than the first complexity level and the third complexity level;

wherein the third alternative operating mode cannot analyze the second type of user inquiry; and wherein the third alternative operating mode cannot analyze the first type of user inquiry.

* * * * *